(12) United States Patent
Moroda

(10) Patent No.: US 10,764,569 B2
(45) Date of Patent: Sep. 1, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Hajime Moroda, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/984,076

(22) Filed: May 18, 2018

(65) Prior Publication Data

US 2018/0343445 A1 Nov. 29, 2018

(30) Foreign Application Priority Data

May 25, 2017 (JP) ................... 2017-103487

(51) Int. Cl.
*H04N 17/00* (2006.01)
*H04N 5/232* (2006.01)

(52) U.S. Cl.
CPC ....... *H04N 17/002* (2013.01); *H04N 5/23203* (2013.01); *H04N 5/23206* (2013.01); *H04N 5/23212* (2013.01); *H04N 5/23245* (2013.01); *H04N 5/23299* (2018.08); *H04N 5/232933* (2018.08); *H04N 5/23216* (2013.01); *H04N 5/23296* (2013.01)

(58) Field of Classification Search
None
See application file for complete search history.

(56) References Cited

U.S. PATENT DOCUMENTS 7,151,565 B1 * 12/2006 Wada ...................... H04N 7/18
348/231.6
2005/0057656 A1    3/2005 Chardon
2017/0268524 A1 *  9/2017 Kanai ..................... H02P 29/00

FOREIGN PATENT DOCUMENTS

| CN | 102566737 A | 7/2012 |
| CN | 104932934 A | 9/2015 |
| CN | 105684084 A | 6/2016 |
| JP | 2006-93805 A | 4/2006 |
| JP | 2010-122634 A | 6/2010 |
| JP | 2012-70281 A | 4/2012 |

* cited by examiner

*Primary Examiner* — Samira Monshi
(74) *Attorney, Agent, or Firm* — Canon U.S.A., Inc. I.P. Division

(57) ABSTRACT

An imaging apparatus acquires a driving condition, which is a condition regarding driving of a driving unit of the imaging apparatus, and determines an index indicating how much the driving unit is used based on the acquired driving condition.

15 Claims, 10 Drawing Sheets

FIG.8A

| DRIVING TYPE | DRIVING LOAD COEFFICIENT |
|---|---|
| CONSTANT SPEED DRIVING (CLOCKWISE DIRECTION) | 1.00 |
| CONSTANT SPEED DRIVING (COUNTERCLOCKWISE DIRECTION) | 1.10 |
| SUDDEN REVERSE DRIVING (CLOCKWISE DIRECTION) | 1.20 |
| SUDDEN REVERSE DRIVING (COUNTERCLOCKWISE DIRECTION) | 1.32 |
| CONTINUOUS TINY DRIVING | 1.40 |

FIG.8B

| DRIVING SPEED | DRIVING COEFFICIENT |
|---|---|
| – 15°/sec | 1.00 |
| 15°/sec – 60°/sec | 1.10 |
| 60°/sec – | 1.20 |

FIG.8C

| TEMPERATURE OF DRIVING MECHANISM | TEMPERATURE COEFFICIENT |
|---|---|
| – 70°C | 1.00 |
| 70°C – 90°C | 1.15 |
| 90°C – | 1.40 |

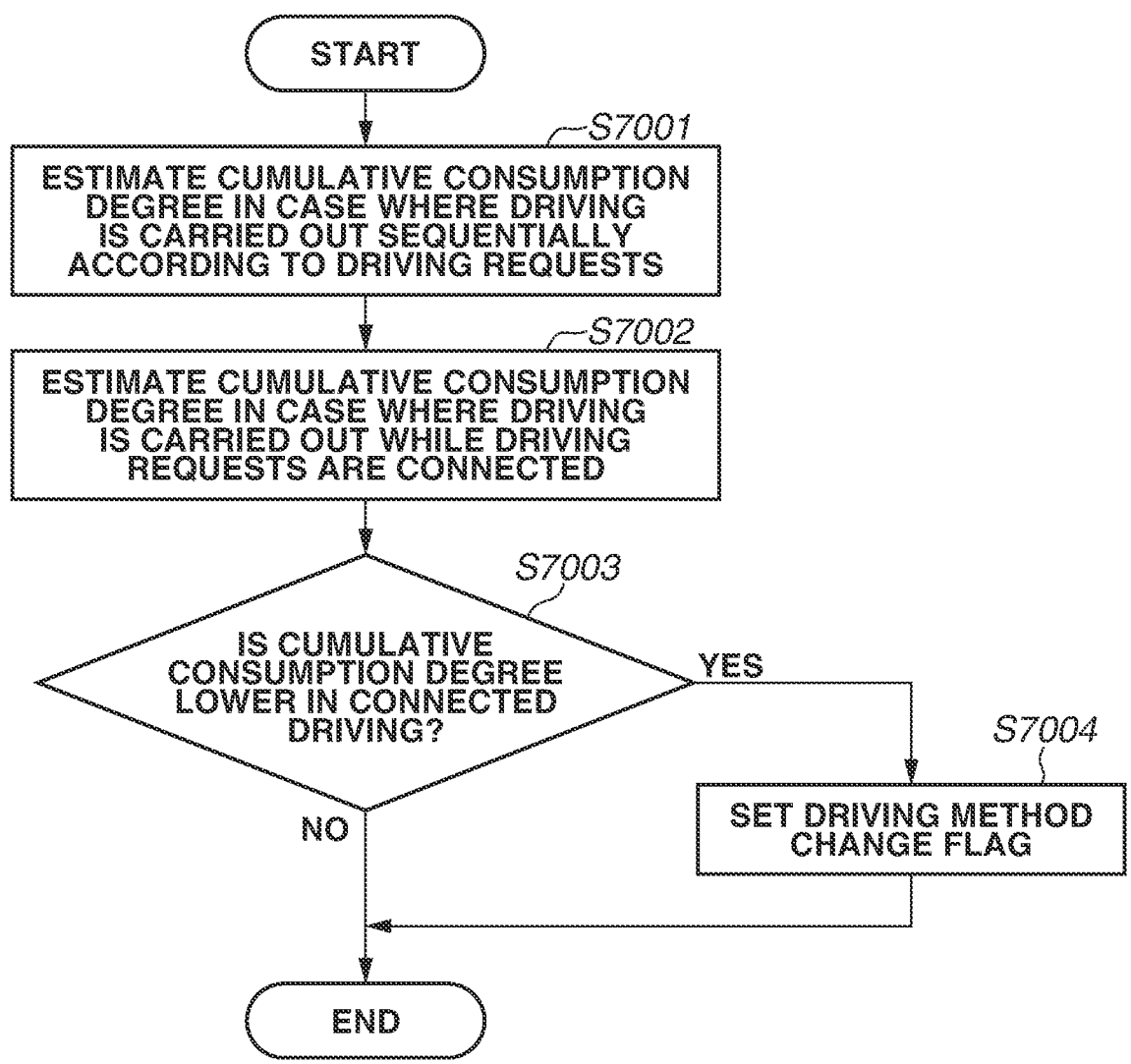

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

Conventionally, there has been known a monitoring system capable of controlling an imaging apparatus such as a monitoring camera to monitor a video image by a remote operation via a network or a dedicated line. Some of imaging apparatuses for use in the monitoring system include a camera platform driving unit that changes an imaging direction by performing a pan (horizontal rotation) operation, a tilt (vertical rotation) operation, and a rotation (rotation in an optical axis direction) operation, thereby being able to image a wide range. Further, some of imaging apparatuses for use in the monitoring system include a lens driving unit, thereby being able to adjust an angle of view and a focus of a captured image by performing a zoom operation and a focus operation.

Such an imaging apparatus allows the imaging direction, the angle of view, and the focus to be freely set by adjustments of a pan angle, a tilt angle, a rotation angle, a zoom position, and a focus position, thereby being able to be installed on a ceiling, a wall surface, and the like. Then, a user himself/herself adjusts the imaging direction, the angle of view, and the focus when installing the imaging apparatus, and uses the imaging apparatus as a fixed camera apparatus without changing them after the installation.

In the imaging apparatus, the driving unit for the camera platform or the like that changes the imaging direction, and the driving unit for the lens that changes the zoom and the focus each have a lifetime, and are subject to an upper limit on the number of times that the driving unit can carry out the driving. This leads to adoption of a practice of detecting the driving unit of the imaging apparatus that reaches the end of the lifetime or acquiring the cumulative number of times of driving of the driving mechanism of the imaging apparatus.

Japanese Patent Application Laid-Open No. 2006-93805 discusses an imaging apparatus that stores a reference value of an applied voltage when the imaging apparatus focuses on a predetermined distance in advance, and detects a lifetime of a liquid lens forming a focus lens based on the applied voltage when the imaging apparatus focuses on an object located at the same distance as this predetermined distance, and the above-described reference value.

Further, the Japanese Patent Application Laid-Open No. 2012-70281 discusses an imaging system including an imaging apparatus that is provided with a driving device for changing an imaging direction and stores the number of times of driving of the driving unit to notify a client of this number of times of driving, and the client that receives the above-described number of times of driving and displays the number of times of driving.

The actual number of times of driving of the driving unit of the imaging apparatus that is acquired in Japanese Patent Application Laid-Open No. 2012-70281 serves as an index indicating how much the driving unit of the imaging apparatus is used. However, for example, the driving unit of the imaging apparatus in a pan direction is rotated by only 1 degree in some cases while being rotated by 179 degrees in other cases during one driving operation. This case means that the driving unit of the imaging apparatus is used more greatly when being rotated by 179 degrees than when being rotated by 1 degree. In this manner, the actual number of times of driving of the driving unit of the imaging apparatus may be unable to serve as the index correctly indicating how much the driving unit is used. Therefore, the present invention is directed to determining a further accurate index.

SUMMARY OF THE INVENTION

According to an aspect of the present invention, an information processing apparatus includes an acquisition unit configured to acquire a driving condition, which is a condition regarding driving of a driving unit of the imaging apparatus, and a determination unit configured to determine an index indicating how much the driving unit is used based on the driving condition acquired by the acquisition unit.

Further features of the present invention will become apparent from the following description of exemplary embodiments with reference to the attached drawings.

BRIEF DESCRIPTION OF THE DRAWINGS

FIGS. 8A, 8B, and 8C each illustrate one example of a table storing a coefficient of a driving condition.

FIG. 10 is a flowchart illustrating one example of processing for comparing driving loads.

DESCRIPTION OF THE EMBODIMENTS

In the following description, exemplary embodiments of the present invention will be described in detail with reference to the drawings.

In the following description, a first exemplary embodiment will be described. A configuration of an information processing system according to the present exemplary embodiment will be described with reference to FIGS. 1A and 1B.

Figure 1A:
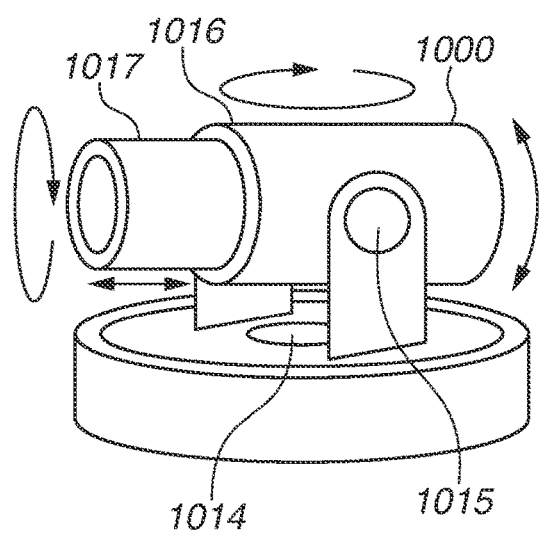
FIGS. 1A and 1B illustrate one example of an outline of an imaging apparatus.

FIG. 1A illustrates one example of an outline of an imaging apparatus 1000. The imaging apparatus 1000 is an imaging apparatus such as a monitoring camera, a network camera, and the like. The imaging apparatus 1000 includes a pan driving mechanism 1014, a tilt driving mechanism 1015, a rotation driving mechanism 1016, and a lens driving mechanism 1017. The imaging apparatus 1000 is one example of an information processing apparatus.

The pan driving mechanism 1014 is a mechanism that includes a mechanical driving system, a motor serving as a driving source, and the like, and changes an imaging direction of the imaging apparatus 1000 in a pan direction. The tilt driving mechanism 1015 is a mechanism that includes a mechanical driving system, a motor serving as a driving source, and the like, and changes the imaging direction of the imaging apparatus 1000 in a tilt direction. The rotation driving mechanism 1016 is a mechanism that includes a mechanical driving system, a motor serving as a driving source, and the like, and changes the imaging direction of the imaging apparatus 1000 in a rotation direction. The lens driving mechanism 1017 is a mechanism that changes an angle of view and a focus of the imaging apparatus 1000.

In the driving mechanism such as the pan driving mechanism 1014, the tilt driving mechanism 1015, the rotation driving mechanism 1016, and the lens driving mechanism 1017, a pinion gear, a cogged belt, a main gear, and the like are being consumed as the driving mechanism repeats the driving. The consumption of the driving mechanism such as wear of a tooth surface of the gear and breakage due to fatigue may reduce a driving performance such as accuracy of a stop position and a capability to maintain a constant speed, and make it impossible for the driving mechanism to drive the imaging apparatus 1000.

Further, as will be described below with reference to FIGS. 2A and 2B, in the present exemplary embodiment, the pan driving mechanism 1014, the tilt driving mechanism 1015, and the rotation driving mechanism 1016 are configured to be connected to a thin coaxial cable 1013, through which a motor driving signal passes. In such a configuration, when these driving mechanisms carry out the driving and the imaging direction of the imaging apparatus 1000 is changed, the thin coaxial cable 1013, through which the motor driving signal passes, is twisted due to a rotation of a mechanism portion in the imaging apparatus 1000. As a result, a load is applied to the thin coaxial cable 1013, a contact point between the thin coaxial cable 1013 and each of the driving mechanisms, and/or the like, and, eventually, the thin coaxial cable 1013 is broken and the driving mechanism reaches the end of the lifetime thereof.

Figure 1B:
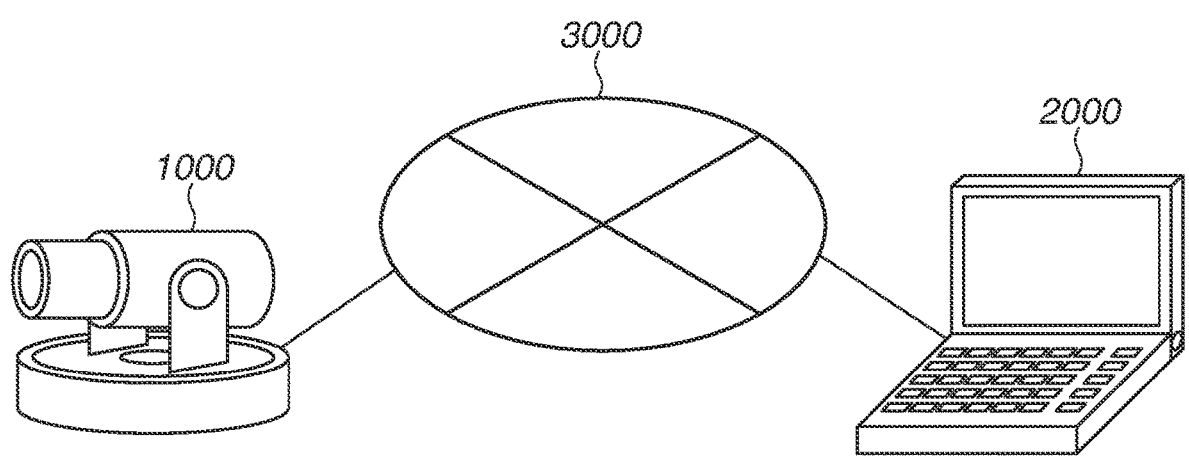

FIG. 1B illustrates one example of a system configuration of an information processing system according to the present exemplary embodiment. The information processing system includes the imaging apparatus 1000 and a client apparatus 2000. The imaging apparatus 1000 and the client apparatus 2000 are connected communicably with each other via a network 3000. The client apparatus 2000 is an information processing apparatus that issues a driving request directed to the driving mechanism and an imaging request to the imaging apparatus 1000, such as a personal computer (PC), a server apparatus, and a tablet apparatus.

The client apparatus 2000 transmits a pan/tilt/rotation driving control command, a zoom/focus driving control command, other various kinds of commands for controlling the camera, and the like to the imaging apparatus 1000. The imaging apparatus 1000 transmits a response to the command received from the client apparatus 2000 and captured image data to the client apparatus 2000.

Figure 2A:
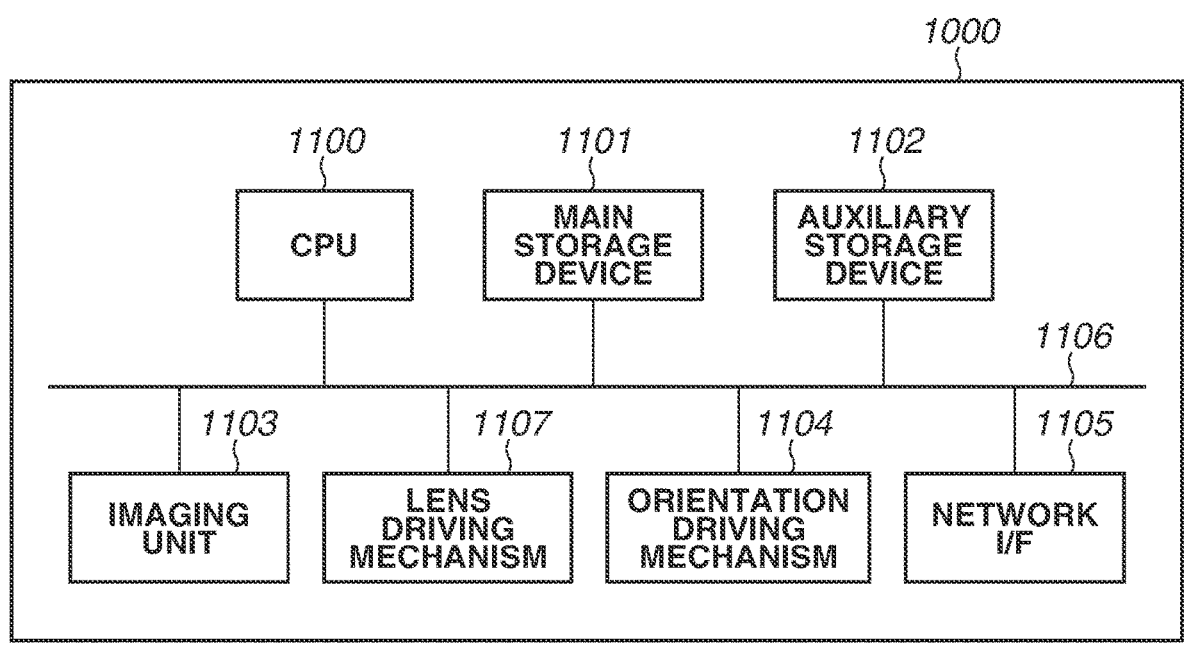
FIGS. 2A and 2B illustrate one example of a hardware configuration of the imaging apparatus.

FIG. 2A illustrates one example of a hardware configuration of the imaging apparatus 1000. The imaging apparatus 1000 includes a central processing unit (CPU) 1100, a main storage device 1101, an auxiliary storage device 1102, an imaging unit 1103, the lens driving mechanism 1017, an orientation driving mechanism 1104, and a network interface (I/F) 1105. Each of the components is connected communicably with one another via a system bus 106.

The CPU 1100 is a central arithmetic device that controls the imaging apparatus 1000. The main storage device 1101 is a storage device that functions as a work area of the CPU 1100 and a location temporarily storing information therein, such as a random access memory (RAM). The auxiliary storage device 1102 is a storage device that stores various kinds of setting information, various kinds of programs, the image captured by the imaging apparatus 1000, various kinds of threshold values, and the like therein, such as a read only memory (ROM), a hard disk drive (HDD), and a solid-state drive (SSD).

The imaging unit 1103 is an imaging unit that includes an optical system such as a focus lens and a zoom lens, and captures images. The lens driving mechanism 1017 is a mechanism that drives the focus lens, the zoom lens, and the like included in the imaging unit 1103, thereby changing the angle of view and the focus of the imaging apparatus 1000 as described with reference to FIG. 1A. The lens driving mechanism 1017 is one example of a lens driving unit of the imaging apparatus 1000. The orientation driving mechanism 1104 is a mechanism that changes an orientation of the imaging apparatus 1000, and a detail thereof will be described below with reference to FIG. 2B. The network I/F 1105 is an interface used in communication between the imaging apparatus 1000 and an external apparatus such as the client apparatus 2000 via the network 3000.

The CPU 1100 performs processing based on the program stored in the auxiliary storage device 1102 or the like, thereby realizing functions of the imaging apparatus 1000 that will be described below with reference to FIG. 4, processing according to flowcharts that will be described below with reference to FIGS. 6, 7, 9, and 10, and the like.

Figure 2B:
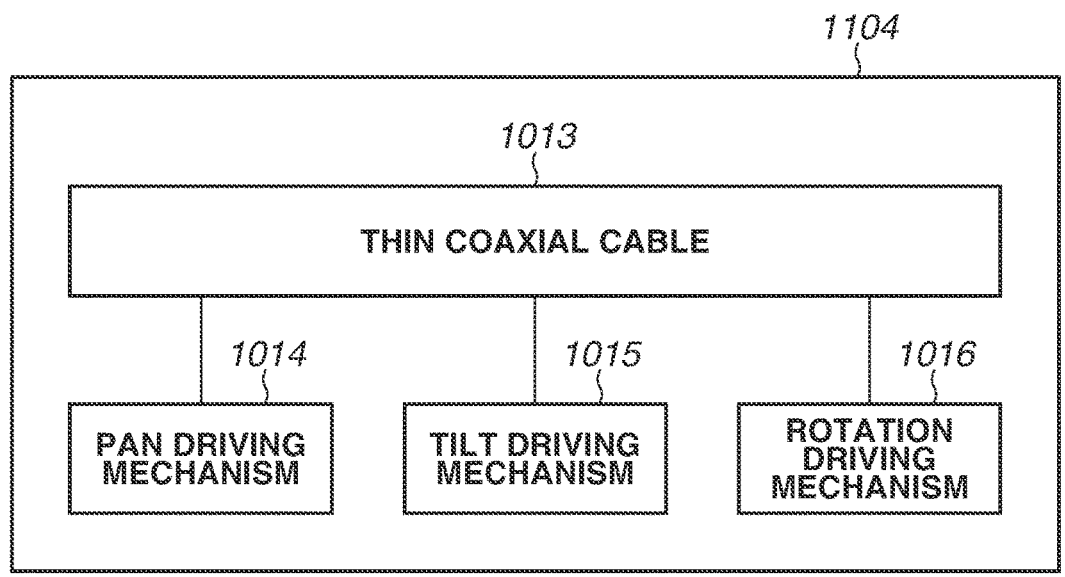

FIG. 2B illustrates one example of the detail of the orientation driving mechanism 1104. The orientation driving mechanism 1104 includes the thin coaxial cable 1013, the pan driving mechanism 1014, the tilt driving mechanism 1015, and the rotation driving mechanism 1016. Each of the driving mechanisms included in the orientation driving mechanism 1104 is one example of an orientation driving unit of the imaging apparatus 1000.

The thin coaxial cable 1013 is a cable used to transmit a driving signal to the pan driving mechanism 1014, the tilt driving mechanism 1015, or the rotation driving mechanism 1016. The pan driving mechanism 1014, the tilt driving mechanism 1015, and the rotation driving mechanism 1016 are the same as the mechanisms described with reference to FIG. 1A.

Figure 3:
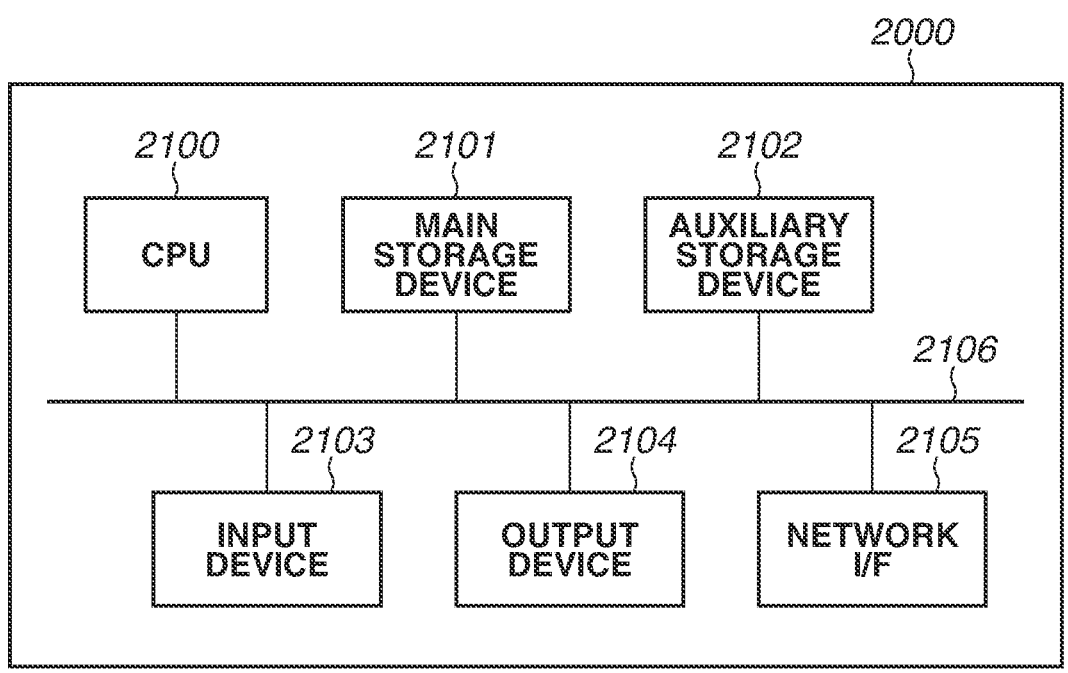
FIG. 3 illustrates one example of a hardware configuration of a client apparatus.

FIG. 3 illustrates one example of a hardware configuration of the client apparatus 2000. The client apparatus 2000 includes a CPU 2100, a main storage device 2101, an auxiliary storage device 2102, an input device 2103, an output device 2104, and a network I/F 2105. Each of the components is connected communicably with one another via a system bus 2106.

The CPU 2100 is a central arithmetic device that controls the client apparatus 2000. The main storage device 2101 is a storage device that functions as a work area of the CPU 2100 and a location temporarily storing information therein, such as a RAM. The auxiliary storage device 2102 is a storage device that stores various kinds of setting information, various kinds of programs, images captured by the imaging apparatus 1000, various kinds of threshold values, and the like therein, such as a ROM, an HDD, and an SSD.

The input device 2103 is an input device used to input information to the client apparatus 2000, such as a keyboard and a mouse. The output device 2104 is an output device used to output information, such as a display that displays and outputs an image and a text, and a speaker that outputs audio. The network I/F 2105 is an interface used in communication between the client apparatus 2000 and an external apparatus such as the imaging apparatus 1000 via the network 3000.

The CPU 2100 performs processing based on the program stored in the auxiliary storage device 2102 or the like, thereby realizing functions of the client apparatus 2000 that will be described below with reference to FIG. 4, processing of the client apparatus 2000, and the like.

Figure 4:
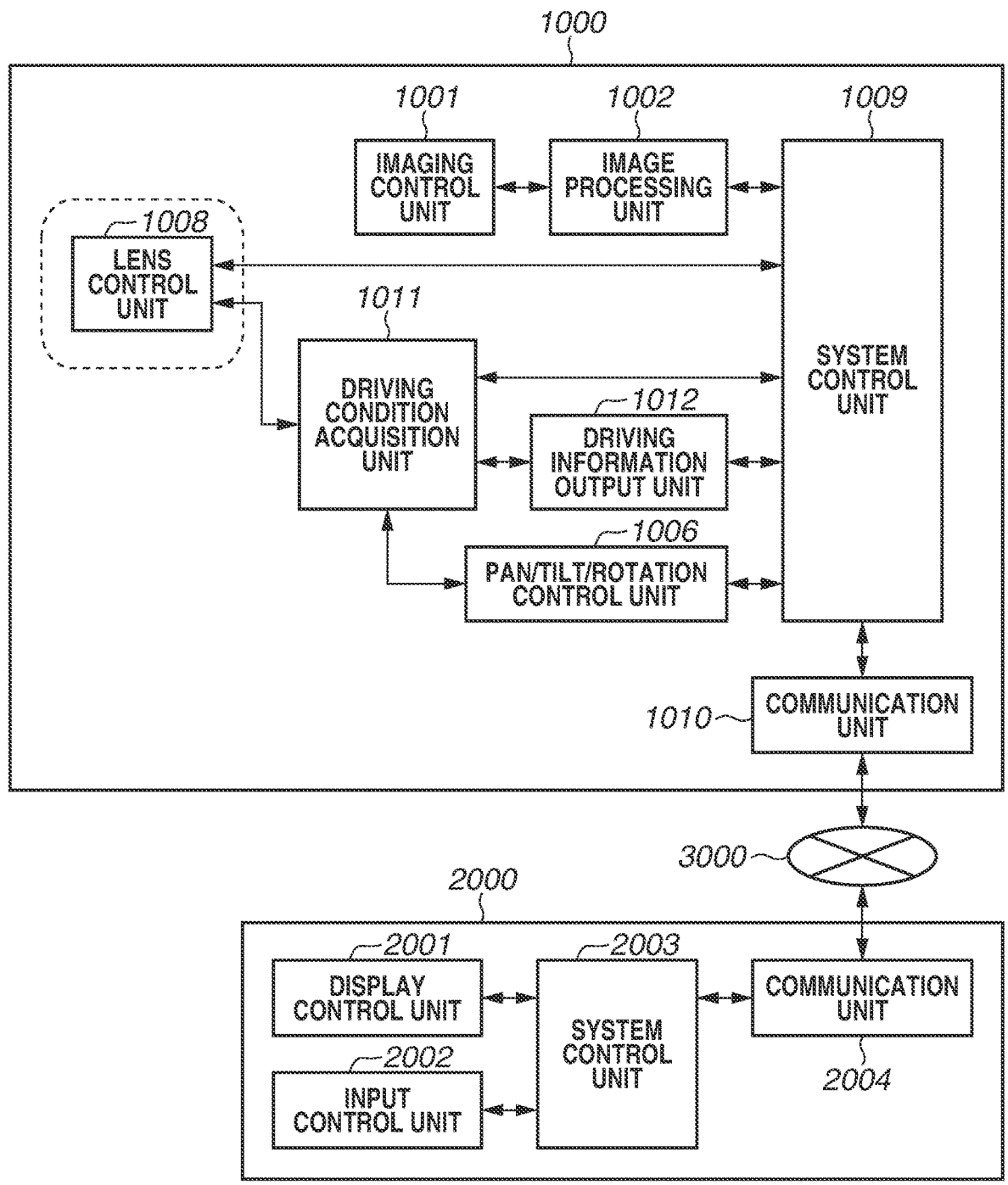
FIG. 4 illustrates one example of a functional configuration of each component of an information processing system.

FIG. 4 illustrates one example of a functional configuration of each of the components of the information processing apparatus according to the present exemplary embodiment. One example of functional configurations of the imaging apparatus 1000 and the client apparatus 2000 will be described with reference to FIG. 4.

The imaging apparatus 1000 includes an imaging control unit 1001, an image processing unit 1002, a pan/tilt/rotation control unit 1006, and a lens control unit 1008. Further, the imaging apparatus 1000 includes a system control unit 1009, a communication unit 1010, a driving condition acquisition unit 1011, and a driving information output unit 1012.

The imaging control unit 1001 converts an optical signal incident on an image sensor into an electric signal via the imaging unit 1103. The image processing unit 1002 performs predetermined development processing and/or compression coding processing on the electric signal converted by the imaging control unit 1001, thereby generating image data.

The pan/tilt/rotation control unit 1006 controls the pan driving mechanism 1014, the tilt driving mechanism 1015, and the rotation driving mechanism 1016 via the thin coaxial cable 1013 according to an instruction from the system control unit 1009. Further, the pan/tilt/rotation control unit 1006 notifies the driving condition acquisition unit 1011 of a driving condition of the pan driving mechanism 1014, the tilt driving mechanism 1015, or the rotation driving mechanism 1016 in response to a request from the driving condition acquisition unit 1011. The driving condition refers to a condition regarding the driving of the driving mechanism, such as a driving amount, a driving speed, a driving operation load, a driving mechanism temperature, and a driving time period.

The lens control unit 1008 controls the lens driving mechanism 1017.

The lens control unit 1008 controls the lens driving mechanism 1017 based on an instruction from the system control unit 1009. Further, the lens control unit 1008 notifies the driving condition acquisition unit 1011 of a driving condition of the lens driving mechanism 1017 in response to a request from the driving condition acquisition unit 1011.

The communication unit 1010 transmits, for example, the image data captured by the imaging apparatus 1000 to the client apparatus 2000 via the network I/F 1105. Further, the communication unit 1010 receives a command transmitted from the client apparatus 2000, such as a command to request driving information regarding the lens driving mechanism 1017, the orientation driving mechanism 1104, or the like, and a camera control command, and transmits the received command to the system control unit 1009. Further, the communication unit 1010 transmits a response to the command received from the client apparatus 2000 to the client apparatus 2000.

The system control unit 1009 analyzes the command such as the camera control command received from the communication unit 1010, and performs processing according to the command. Further, the system control unit 1009 analyzes the pan/tilt/rotation driving command or the lens driving request command received from the communication unit 1010, and transmits the driving instruction to the pan/tilt/rotation control unit 1006 or the lens control unit 1008. Further, the system control unit 1009 analyzes the driving information request command received from the communication unit 1010, and requests the driving information to the driving information output unit 1012. Then, the system control unit 1009 transmits the driving information transmitted from the driving information output unit 1012 to the client apparatus 2000 via the communication unit 1010. Further, the system control unit 1009 acquires the driving time period of the pan driving mechanism 1014, the tilt driving mechanism 1015, or the rotation driving mechanism 1016 from the pan/tilt/rotation control unit 1006, and stores the acquired driving time period into the auxiliary storage device 1102 or the like. Further, the system control unit 1009 acquires the driving time period of the lens driving mechanism 1017 from the lens control unit 1008, and stores the acquired driving time period into the auxiliary storage device 1102 or the like.

The driving condition acquisition unit 1011 acquires the driving condition regarding each of the pan driving mechanism 1014, the tilt driving mechanism 1015, and the rotation driving mechanism 1016 from the pan/tilt/rotation control unit 1006. Hereinafter, the pan driving mechanism 1014, the tilt driving mechanism 1015, and the rotation driving mechanism 1016 will be collectively referred to as a pan/tilt/rotation (PTR) driving mechanism. Further, the driving condition acquisition unit 1011 acquires the driving condition regarding the lens driving mechanism 1017 from the lens control unit 1008. Then, the driving condition acquisition unit 1011 stores the acquired driving condition into the auxiliary storage device 1102 or the like.

The driving information output unit 1012 determines the driving information for notifying the client apparatus 2000 based on the driving condition acquired by the driving condition acquisition unit 1011. The driving information refers to information indicating how much the driving unit is used. Examples of the driving information include a cumulative number of times of driving of the driving unit, a cumulative amount of driving of the driving unit, and a remaining number of times that the driving unit can carry out the driving. Further, the driving information may be these pieces of information corrected based on the driving condition.

In the present exemplary embodiment, the driving information is assumed to be the number of times of driving of each of the driving mechanisms in the PTR driving mechanism or the lens driving mechanism 1017 that is corrected based on the driving condition acquired by the driving condition acquisition unit 1011.

Subsequently, one example of the functional configuration of the client apparatus 2000 will be described.

The client apparatus 2000 includes a display control unit 2001, an input control unit 2002, a system control unit 2003, and a communication unit 2004.

The display control unit 2001 controls processing for displaying the image captured by the imaging apparatus 1000, a user interface screen (hereinafter referred to as a graphical user interface (GUI)) used to operate the imaging apparatus 1000, and the like on the output device 2104. Further, the display control unit 2001 displays the driving information regarding the PTR driving mechanism or the lens driving mechanism 1017 of the imaging apparatus 1000 on the output device 2104. The display control unit 2001 displays, for example, a maximum number of times of driving and a current number of times of driving of each of the driving mechanisms in the form of numerical values or a graph on the output device 2104. Further, the display control unit 2001 may change a display color and/or display a warning pop-up according to the current driving information.

The input control unit 2002 receives an input of information via the input device 2103.

The system control unit 2003 generates the camera control command and transmits the generated camera control command to the imaging apparatus 1000 via the communication unit 2004 according to an operation performed by a user on the GUI via the input device 2103. Further, the system control unit 2003 instructs the display control unit 2001 to display the image data received from the imaging apparatus 1000 via the communication unit 2004. Further, the system control unit 2003 acquires the driving control request directed to or the driving information regarding each of the driving mechanisms (the pan, the tilt, the rotation, the zoom, and the focus) of the imaging apparatus 1000 according to an operation performed by the user on the GUI. The system control unit 2003 transmits the control command directed to the imaging apparatus 1000 to the imaging apparatus 1000 via the communication unit 2004.

The system control unit 2003 may issue the command to request the driving information to the imaging apparatus 1000 periodically at a predetermined time interval, may issue this command to the imaging apparatus 1000 at an arbitrary timing specified by the user via the GUI, or may issue this command at a timing after the driving control. When detecting that the driving information regarding each of the driving mechanisms of the imaging apparatus 1000 is updated, the system control unit 2003 instructs the display control unit 2001 to display the driving information after the update on the output device 2104 according to this detection.

Further, the system control unit 2003 may be configured to switch a mode of the imaging apparatus 1000 based on an operation performed by the user on the GUI. Examples of the mode of the imaging apparatus 1000 include a mode of transmitting the driving information corrected based on the driving condition to the client apparatus 2000, and a mode of transmitting the driving information to the client apparatus 2000 without correcting it. Further, examples of the mode of the imaging apparatus 1000 include a mode of correcting the driving information based on only the driving amount of the driving unit among the driving conditions, and a mode of correcting the driving information while also using another driving condition.

In this manner, the client apparatus 2000 can issue the imaging instruction and perform various kinds of camera control with respect to the imaging apparatus 1000 via the network 3000.

Figure 5:
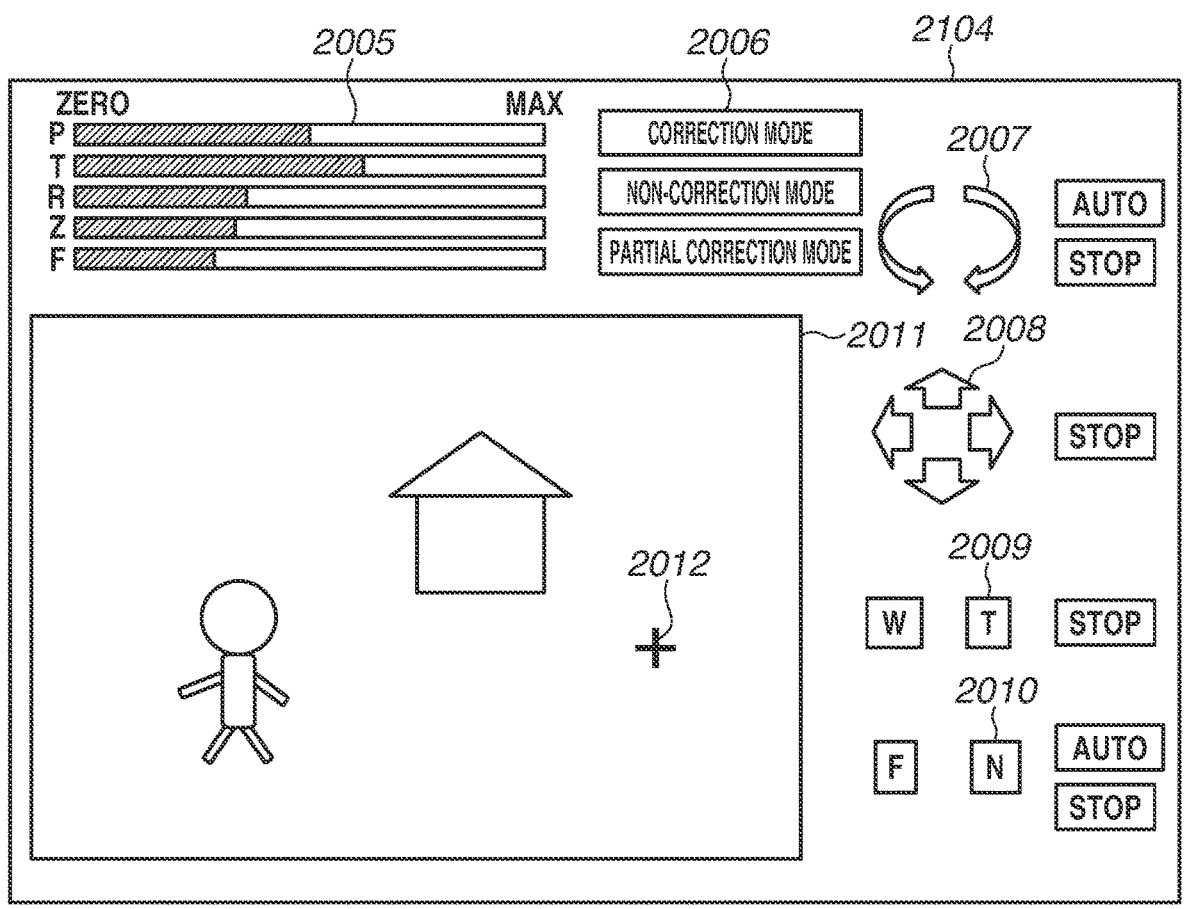
FIG. 5 illustrates one example of a display screen.

FIG. 5 illustrates one example of a display screen displayed by the display control unit 2001 on the output device 2104. The display screen includes display bars 2005, buttons 2006 to 2010, a display region 2011, and a cursor 2012.

The display bars 2005 are each a display bar indicating the number of times of driving of the driving mechanism. The display bars 2005 indicate the number of times of driving of the pan driving mechanism 1014, the number of times of driving of the tilt driving mechanism 1015, the number of times of driving of the rotation driving mechanism 1016, the number of times of zoom driving by the lens driving mechanism 1017, and the number of times of focus driving by the lens driving mechanism 1017. The display bars 2005 each display to what extent the driving mechanism is caused to carry out the driving relative to an upper limit on the number of times of driving of each of the driving mechanisms. Information indicating the upper limit on the number of times of driving of each of the driving mechanisms is stored in, for example, the auxiliary storage device 1102 of the imaging apparatus 1000 in advance. When receiving a request for the information indicating the upper limit on the number of times of driving of each of the driving mechanism from the client apparatus 2000, the system control unit 1009 of the imaging apparatus 1000 acquires the information indicating the upper limit on the number of times of driving of each of the driving mechanisms from the auxiliary storage device 1102 or the like, and transmits the acquired information to the client apparatus 2000 that is a source of the request. The client apparatus 2000 acquires the information indicating the upper limit on the number of times of driving of each of the driving mechanisms from the imaging apparatus 1000.

The buttons 2006 are buttons used to select the mode of the imaging apparatus 1000.

The buttons 2007 are buttons used to instruct the imaging apparatus 1000 to cause the rotation driving mechanism 1016 to carry out the driving. The buttons 2008 are buttons used to instruct the imaging apparatus 1000 to cause the pan driving mechanism 1014 or the tilt driving mechanism 1015 to carry out the driving. The buttons 2009 are buttons used to instruct the imaging apparatus 1000 to cause the lens driving mechanism 1017 to carry out the zoom driving. The buttons 2010 are buttons used to instruct the imaging apparatus 1000 to cause the lens driving mechanism 1017 to carry out the focus driving.

The buttons 2007 include an AUTO button for instructing the imaging apparatus 1000 to be rotated so as to arrange the captured image horizontally. The buttons 2010 include an AUTO button for instructing the imaging apparatus 1000 to carry out automatic focusing.

The display region 2011 is a display region where the image received from the imaging apparatus 1000 is displayed. The cursor 2012 is a cursor for instructing the imaging apparatus 1000 to adjust the imaging direction (cause the pan driving mechanism 1014 or the tilt driving mechanism 1015 to carry out the driving) so as to place a position of the cursor 2012 at a center of the captured image.

Figure 6:
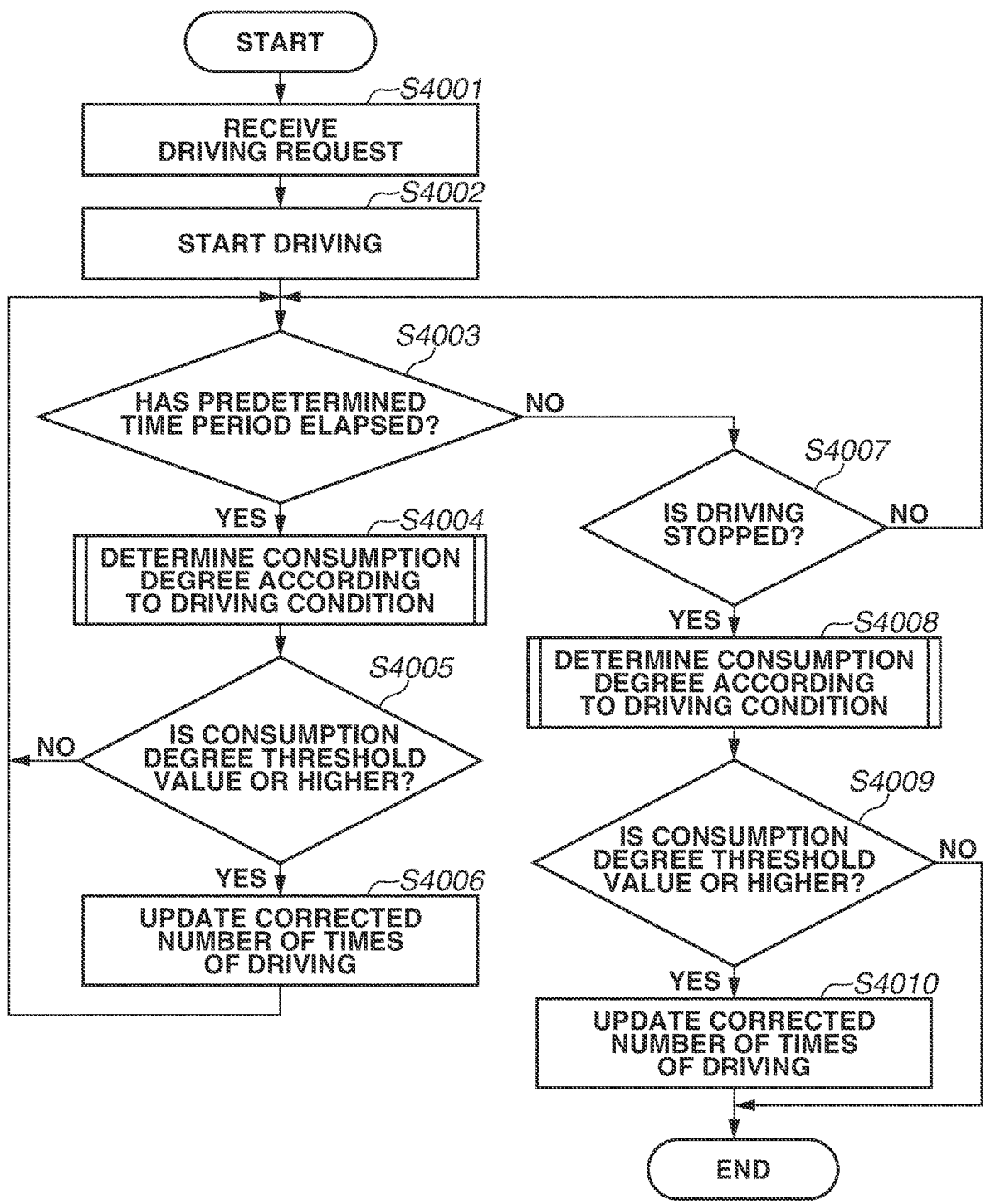
FIG. 6 is a flowchart illustrating one example of processing for determining driving information.

FIG. 6 is a flowchart illustrating one example of processing for determining the driving information. This flowchart indicates processing in which the imaging apparatus 1000 starts the driving of the PTR driving mechanism or the lens driving mechanism 1017 according to the driving request from the client apparatus 2000 and determines the corrected number of times of driving, which is the driving information, based on the driving condition, and this processing will be described now with reference to FIG. 6. The processing illustrated in FIG. 6 is processing in which the imaging apparatus 1000 receives a driving request in a specified direction as the driving request, continues the driving in the specified direction until the driving request is stopped, and outputs the driving information when a predetermined time period has elapsed or the driving request is stopped. The imaging apparatus 1000 may be configured to receive a driving request for specifying an absolute value or a relative value from the client apparatus 2000 instead of the request to continue the driving in the specified direction as the driving request.

Further, the processing illustrated in FIG. 6 is processing when the imaging apparatus 1000 receives the driving request regarding any one of the PTR driving mechanism and the lens driving mechanism 1017.

In step S4001, the communication unit 1010 receives the driving request command directed to any one of the PTR driving mechanism and the lens driving mechanism 1017 from the client apparatus 2000 via the network 3000, and transmits the received driving request command to the system control unit 1009. The communication unit 1010 receives, for example, a driving request for the automatic focus control directed to the lens driving mechanism 1017 or automatic level control (control for arranging the screen horizontally) directed to the PTR driving mechanism. In step S4002, the system control unit 1009 transmits the driving instruction directed to the PTR driving mechanism or the lens driving mechanism 1017 to the pan/tilt/rotation control unit 1006 or the lens control unit 1008 according to the command received in step S4001. By this processing, the PTR driving mechanism or the lens driving mechanism 1017 starts the driving.

In step S4003, the system control unit 1009 determines whether a predetermined time period has elapsed since the start of the driving of the PTR driving mechanism or the lens driving mechanism 1017 according to the driving instruction transmitted in step S4002. Information indicating this predetermined time period is stored in the auxiliary storage device 1102 or the like in advance. The predetermined time period, for example, may be a time period taken to swivel by 360 degrees or may be another time period in a case of the driving mechanism that swivels by 360 degrees.

If the system control unit 1009 determines that the predetermined time period has elapsed (YES in step S4003), the processing proceeds to a process of step S4004. If the system control unit 1009 determines that the predetermined time period has not elapsed (NO in step S4003), the processing proceeds to a process of step S4007.

In step S4004, the driving condition acquisition unit 1011 acquires the driving condition of the driving mechanism having started the driving in step S4002 from the pan/tilt/rotation control unit 1006 or the lens control unit 1008 and the system control unit 1009. Then, the driving information output unit 1012 calculates a consumption degree of the driving mechanism having started the driving in step S4002 based on the acquired driving condition.

Figure 7:
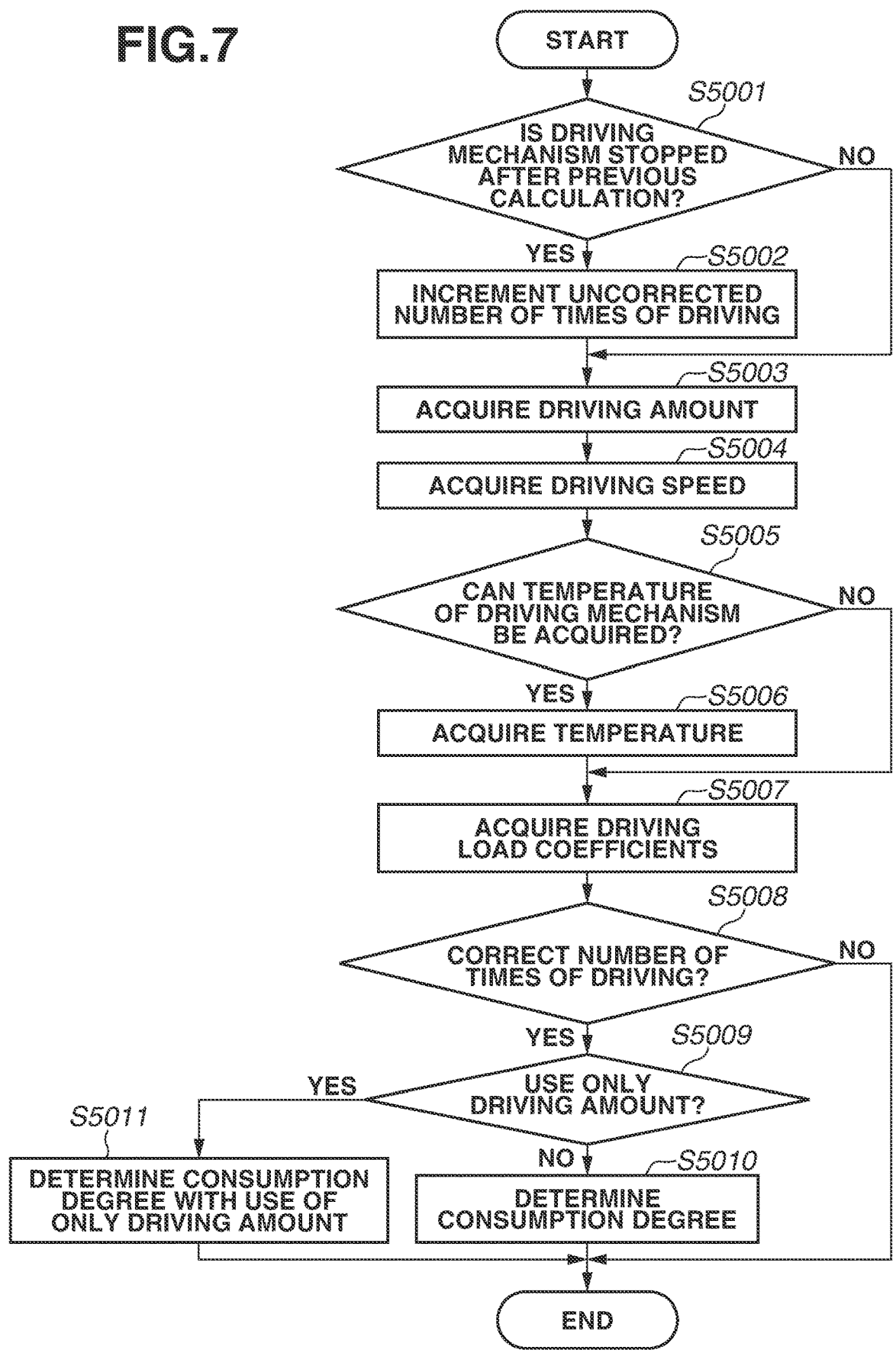
FIG. 7 is a flowchart illustrating one example of processing for acquiring a consumption degree.

FIG. 7 is a flowchart illustrating one example of processing for acquiring the consumption degree. A detail of the process of step S4004 will be described with reference to FIG. 7.

In step S5001, the driving condition acquisition unit 1011 determines whether the driving mechanism having started the driving in step S4002 is stopped after the previous execution of the process of step S4004. If the driving condition acquisition unit 1011 determines that the driving mechanism having started the driving in step S4002 is stopped (YES in step S5001), the processing proceeds to a process of step S5002. If the driving condition acquisition unit 1011 determines that the driving mechanism having started the driving in step S4002 is not stopped (NO in step S5001), the processing proceeds to a process of step S5003.

In step S5002, the driving condition acquisition unit 1011 updates the actual number of times of driving of the driving mechanism having started the driving in step S4002 that is stored in the auxiliary storage device 1102 or the like. The driving condition acquisition unit 1011 updates this number by adding one to a value of the actual number of times of driving of the driving mechanism having started the driving in step S4002 that is stored in the auxiliary storage device 1102 or the like. The actual number of times of driving refers to the number of times of driving that is cumulated by counting an operation since the driving mechanism starts the driving until the driving mechanism stops the driving as one driving operation. If the actual number of times of driving of the driving mechanism having started the driving in step S4002 is not stored in the auxiliary storage device 1102 or the like, the driving condition acquisition unit 1011 stores the actual number of times of driving as once into the auxiliary storage device 1102 or the like, assuming that this is the first time that the driving mechanism carries out the driving.

In step S5003, the driving condition acquisition unit 1011 acquires the driving amount of the driving mechanism having started the driving in step S4002 from the pan/tilt/rotation control unit 1006 or the lens control unit 1008 as the driving condition. The driving amount refers to a value indicating how much the driving mechanism carries out the driving, and, for example, a driving angle or a driving distance.

Now, how the driving amount of the driving mechanism is calculated will be described. For example, if a speed reduction ratio of the driving mechanism is 1:a, and the driving mechanism is caused to carry out the driving with use of a stepping motor configured to be driven by an angle of b degrees per step, the number of steps required to drive the motor by one rotation is 360/b steps. Therefore, the number of steps required to cause the driving mechanism to carry out the driving by one rotation or by one reciprocating movement is calculated to be a×360/b steps. Further, if a total count value of the number of pulses supplied to drive the motor is c, the number of rotations of the driving mechanism is calculated to be c/(a×360/b).

In step S5004, the driving condition acquisition unit 1011 acquires the driving speed of the driving mechanism having started the driving in step S4002 from the pan/tilt/rotation control unit 1006 or the lens control unit 1008 as the driving condition, and stores the acquired driving speed into the auxiliary storage device 1102 or the like. At this time, the driving condition acquisition unit 1011 may calculate the driving speed by, for example, dividing the driving amount of the driving mechanism by the driving time period of the driving mechanism.

In step S5005, the driving condition acquisition unit 1011 determines whether the temperature of the driving mechanism having started the driving in step S4002 can be acquired. If the driving condition acquisition unit 1011 determines that the temperature of the driving mechanism having started the driving in step S4002 can be acquired (YES in step S5005), the processing proceeds to a process of step S5006. If the driving condition acquisition unit 1011 determines that the temperature of the driving mechanism having started the driving in step S4002 cannot be acquired (NO in step S5005), the processing proceeds to a process of step S5007. The driving condition acquisition unit 1011 does not have to acquire the temperature in a case where, for example, a position at which a temperature sensor to be used is mounted is an inappropriate position for measuring the temperature of the driving mechanism.

In step S5006, the driving condition acquisition unit 1011 acquires the temperature of the driving mechanism having started the driving in step S4002 as the driving condition via, for example, the temperature sensor of the imaging apparatus 1000, and stores the acquired temperature into the auxiliary storage device 1102 or the like. The driving condition acquisition unit 1011 acquires a value of the temperature sensor mounted on the imaging apparatus 1000 as the temperature via the system control unit 1009. The driving condition acquisition unit 1011 may acquire the temperature of each of the driving mechanisms with use of the temperature sensor mounted inside the imaging apparatus 1000 or may acquire the temperature of each of the driving mechanisms with use of an external temperature sensor. Alternatively, the imaging apparatus 1000 may be configured in such a manner that the temperature sensor is mounted on each of the driving mechanisms in the imaging apparatus 1000. The driving condition acquisition unit 1011 may acquire temperatures of a plurality of driving mechanisms with use of the value(s) of one or more temperature sensor(s).

In step S5007, the driving condition acquisition unit 1011 acquires driving load coefficients indicating loads on the driving mechanism having started the driving in step S4002 during the driving via the pan/tilt/rotation control unit 1006 or the lens control unit 1008, and stores the acquired driving load coefficients into the auxiliary storage device 1102 or the like. FIGS. 8A to 8C each illustrate one example of the driving load coefficients stored by the driving condition acquisition unit 1011 into the auxiliary storage device 1102 or the like. The driving condition acquisition unit 1011, for example, acquires a driving load coefficient defined for each type of driving, stores the acquired driving load coefficient into the auxiliary storage device 1102 or the like in the form of a table as illustrated in FIG. 8A, and refers to this table. Alternatively, the imaging apparatus 1000 may be configured in such a manner that information indicating the driving load coefficient defined for each type of driving is stored in the auxiliary storage device 1102 or the like in advance. A coefficient table illustrated in FIG. 8B is a table storing therein a driving load coefficient defined for each driving speed. A coefficient table illustrated in FIG. 8C is a table storing therein a driving load coefficient defined for each temperature of the driving mechanism.

Constant speed driving in FIG. 8A refers to a type indicating driving of continuing the driving at a constant speed from an already driving state or driving of continuing the driving at a constant speed from a stationary state. Further, sudden reverse driving refers to a type indicating driving when the driving mechanism carries out the driving in an opposite direction immediately after carrying out the driving in a certain direction. Then, in the example illustrated in FIG. 8A, the driving load coefficient is defined according to driving in the clockwise direction and driving in the counterclockwise direction for both the constant speed driving and the sudden reverse driving.

The example illustrated in FIG. 8A is an example in the case of the PTR driving mechanism. In the case of the lens driving mechanism 1017, there are a wide direction and a telephoto direction at the time of the zooming, and a near direction and a far direction at the time of the focusing, as the directions. Further, continuous tiny driving in FIG. 8A refers to a type indicating, for example, continuous tiny driving at the time of a focus adjustment when the lens driving mechanism 1017 is instructed to carry out the driving for the automatic focusing. Examples of the driving whose type is the continuous tiny driving also include continuous tiny driving at the time of a horizontal adjustment when the rotation driving mechanism 1016 is instructed to carry out the driving for the automatic leveling for rotating the imaging direction horizontally. In a case where the driving mechanism does not support the driving whose type is the continuous tiny driving, the driving load coefficient of the continuous tiny driving may be omitted.

In step S5008, the driving condition acquisition unit 1011 determines whether to determine the corrected number of times of driving of the driving mechanism having started the driving in step S4002 that is stored in the auxiliary storage device 1102 or the like. The driving condition acquisition unit 1011 determines to determine the corrected number of times of driving of the driving mechanism having started the driving in step S4002 if, for example, the mode of the imaging apparatus 1000 is the mode of determining the corrected number of times of driving of the driving mechanism. On the other hand, the driving condition acquisition unit 1011 determines not to determine the corrected number of times of driving of the driving mechanism having started the driving in step S4002 if, for example, the mode of the imaging apparatus 1000 is the mode of not determining the corrected number of times of driving of the driving mechanism.

If the driving condition acquisition unit 1011 determines to determine the corrected number of times of driving of the driving mechanism having started the driving in step S4002 that is stored in the auxiliary storage device 1102 or the like (YES in step S5008), the processing proceeds to a process of step S5009. If the driving condition acquisition unit 1011 determines not to determine the corrected number of times of driving of the driving mechanism having started the driving in step S4002 that is stored in the auxiliary storage device 1102 or the like (NO in step S5008), the processing illustrated in FIG. 7 is ended. The mode of the imaging apparatus 1000 is switched in the following manner. The client apparatus 2000 transmits an instruction to switch the mode to the imaging apparatus 1000 based on the operation performed by the user on the GUI displayed on the output device 2104. When receiving the instruction to switch the mode from the client apparatus 2000, the imaging apparatus 1000 updates information indicating the mode of the imaging apparatus 1000 that is stored in the auxiliary storage device 1102 for example, and switches the mode of the imaging apparatus 1000. The imaging apparatus 1000 does not necessarily have to have the mode, and may be configured to always correct the driving information.

In step S5009, the driving condition acquisition unit 1011 determines whether the driving condition used to determine the driving information is only the driving amount of the driving mechanism. If the driving condition acquisition unit 1011 determines that the driving condition used to determine the driving information is only the driving amount of the driving mechanism (YES in step S5009), the processing proceeds to a process of step S5011. If the driving condition acquisition unit 1011 determines that the driving condition used to determine the driving information is not only the driving amount of the driving mechanism (NO in step S5009), the processing proceeds to a process in step S5010. The driving condition acquisition unit 1011 performs the process of step S5009 based on, for example, whether the mode of the imaging apparatus 1000 is the mode of determining the driving information with use of only the driving amount.

The driving information may be unable to be appropriately determined even with use of the driving conditions acquired in steps S5004 and S5006 depending on an environment under which the imaging apparatus 1000 is installed. In such a case, the user instructs the imaging apparatus 1000 to switch the mode to the mode of determining the driving information with use of only the driving amount of the driving mechanism via the GUI displayed on the output device 2104.

In step S5010, the driving information output unit 1012 determines the consumption degree indicating how much the driving mechanism having started the driving in step S4002 is consumed by the driving carried out this time based on the driving conditions acquired in steps S5003, S5004, and S5006. The driving information output unit 1012 calculates, for example, a sum of a product of the driving amount of the driving unit, the driving load coefficient, the speed coefficient, and the temperature coefficient, and a braking correction term as the consumption degree with use of the following equation 1. The driving information output unit 1012 determines the consumption degree as a value indicating the consumption of the driving mechanism after the previous determination of the consumption degree. Further, the braking correction term in the equation 1 is a correction term set in consideration of a load when the driving unit is braked (stopped), and a value thereof is determined according to a characteristic of each of the driving mechanisms and is stored in the auxiliary storage device 1102 or the like in advance. When the driving mechanism is carrying out the driving at a constant speed in the same direction, the braking correction term has a value of 0 because the driving mechanism is not stopped.

> consumption degree=driving amount×driving load coefficient×speed coefficient×temperature coefficient+braking correction term  (Equation 1)

The driving information output unit 1012 acquires the driving load coefficient, the speed coefficient, and the temperature coefficient in the calculation of the consumption degree using the equation 1, for example, in the following manner. That is, the driving information output unit 1012 acquires the values of the driving load coefficients associated with the driving conditions acquired in steps S5003, S5004, and S5006 by referring to the coefficient tables illustrated in FIGS. 8A, 8B, and 8C, respectively.

The system control unit 1009 records each of the coefficient tables illustrated in FIGS. 8A to 8C in the auxiliary storage device 1102 or the like. Further or alternatively, the driving information output unit 1012 may use a coefficient table other than the coefficient tables illustrated in FIGS. 8A to 8C, or may determine the consumption degree with use of a calculation equation directly using the value itself of each of the driving conditions instead of referring to the coefficient tables. Further, the value of each of the coefficients and the braking correction term may be a value defined based on an actually measured value or a value calculated in consideration of the characteristic of the driving mechanism. Further, the driving information output unit 1012 does not have to determine the consumption degree with use of all the acquired driving conditions and may determine the consumption degree with use of a part of the acquired driving conditions in the process of step S5010. Further or alternatively, the driving information output unit 1012 may determine the consumption degree with use of a different driving condition besides the acquired driving conditions.

Further, the driving information output unit 1012 determines a cumulative consumption degree with use of the following equation 2. In other words, the driving information output unit 1012 determines the cumulative consumption degree by cumulating the consumption degrees determined with use of the equation 1 until this time.

> cumulative consumption degree=cumulative consumption degree cumulated until when the previous calculation has been carried out+consumption degree when the present calculation is carried out  (Equation 2)

For example, suppose that the driving mechanism having started the driving in step S4002 is the pan driving mechanism 1014. Further, suppose that the pan driving mechanism 1014 carries out the driving by 15 degrees from the stationary state as the constant speed driving (in the counterclockwise direction) at a driving speed of 10 degree/sec and a motor case surface temperature of 80 degrees Celsius. Further, suppose that the braking correction term of the pan driving mechanism 1014 is 5 degrees. The driving information output unit 1012 determines the consumption degree indicating how much the pan driving mechanism 1014 is consumed since the previous determination of the consumption degree by referring to the coefficient tables based on these numerical values and substituting the acquired driving load coefficients into the equation 1.

This calculation yields the following result.

> consumption degree=15×1.0×1.00×1.15+5≈23.98 degrees

Further, suppose that the cumulative consumption degree is 705 degrees. In this case, the driving information output unit 1012 determines the cumulative consumption degree in the following manner with use of the equation 2.

> cumulative consumption degree=705+23.98=728.98 degrees

This cumulative consumption degree serves as an index indicating how much the driving mechanism is consumed since the start of the driving at this time until the current time point with respect to the driving mechanism having started the driving in step S4002.

In step S5011, the driving information output unit 1012 determines the cumulative consumption degree since the start of the driving at this time until the current time point with respect to the driving mechanism having started the driving in step S4002 with use of only the driving amount acquired in step S5003 as the driving condition. The driving information output unit 1012 determines that, for example, the value of the driving amount acquired in step S5003 is the consumption degree of the driving mechanism having started the driving in step S4002 since the previous execution of the processing for determining the cumulative consumption degree.

For example, suppose that the driving mechanism having started the driving in step S4002 is the pan driving mechanism 1014. Further, suppose that the pan driving mechanism 1014 carries out the driving by 15 degrees from the stationary state. In this case, the driving information output unit 1012 determines that the consumption degree of the driving mechanism having started the driving in step S4002 since the previous execution of the processing for determining the cumulative consumption degree (the process of step S5010 or S5011) is 15 degrees. If the cumulative consumption degree determined by the previous execution of the processing for determining the cumulative consumption degree is 705 degrees, the driving information output unit 1012 determines that the cumulative consumption degree is 705+15=720 degrees. Then, the processing proceeds to a process of step S4005.

In step S4005, the driving information output unit 1012 determines whether the cumulative consumption degree determined in step S4004 is a predetermined threshold value or higher. If the driving information output unit 1012 determines that the cumulative consumption degree determined in step S4004 is the predetermined threshold value or higher (YES in step S4005), the processing proceeds to a process of step S4006. On the other hand, if the driving information output unit 1012 determines that the cumulative consumption degree determined in step S4004 is lower than the predetermined threshold value (NO in step S4005), the processing proceeds to the process of step S4003. Further, if the driving information output unit 1012 determines that the mode of the imaging apparatus 1000 is the mode of not determining the driving information, the processing proceeds to the process of step S4003.

The driving information output unit 1012 may determine the threshold value used in the process of step S4005 by, for example, acquiring a value calculated from the following equation 3 based on a reciprocating driving amount when the orientation driving mechanism 1104 or the lens driving mechanism 1107 carries out reciprocating driving between one end and the other end. A corrected cumulative number of times of driving refers to the cumulative number of times of driving of the driving mechanism that is corrected, and is stored in the auxiliary storage device 1102 or the like and updated by the process of step S4006.

$$\text{threshold value} = (\text{corrected cumulative number of times of driving} + 1) \times \text{reciprocating driving amount} \quad \text{(Equation 3)}$$

Now, for example, supposing that the reciprocating driving amount of the pan driving mechanism 1014 is 360 degrees and the corrected cumulative number of times of driving until this time is once, 720 degrees is acquired as the threshold value calculated from the equation 3. Further, supposing that the cumulative consumption degree determined in step S4004 is 729 degrees, the driving information output unit 1012 determines that the cumulative consumption degree is the threshold value or higher because of the cumulative consumption degree=729 degrees>the threshold value=720 degrees.

In step S4006, the driving information output unit 1012 updates the corrected cumulative number of times of driving stored in the auxiliary storage device 1102 or the like. The driving information output unit 1012 updates the value of the corrected cumulative number of times of driving as, for example, a value of a quotient of the cumulative consumption degree/the reciprocating driving amount. For example, if the cumulative consumption degree is 729 degrees and the reciprocating driving amount is 360 degrees, the driving information output unit 1012 updates the corrected cumulative number of times of driving as twice from the following calculation.

$$729/360 = 2 \text{ with a remainder of } 9$$

If the cumulative consumption degree is 729 degrees, this means that the driving mechanism has been consumed cumulatively to a degree indicated by the consumption degree of 729 degrees until this time. Further, if the reciprocating driving amount is 360 degrees, assuming that the driving mechanism is consumed to a degree corresponding to 360 degrees equivalent to one reciprocating driving operation when the driving mechanism carries out the driving once, the consumption degree reaching 729 degrees cumulatively means that the driving mechanism is consumed to a degree that the driving mechanism has carried out approximately two reciprocating driving operations.

In step 4007, the system control unit 1009 determines whether the driving mechanism having started the driving in step S4002 stops the driving. If the system control unit 1009 determines that the driving mechanism having started the driving in step S4002 stops the driving (YES in step S4007), the processing proceeds to a process of step S4008. If the system control unit 1009 determines that the driving mechanism having started the driving in step S4002 does not stop the driving (NO in step S4007), the processing proceeds to the process of step S4003.

Processes of steps S4008 to S4010 are similar processes to steps S4004 to S4006. However, in the case of step S4008, after the driving condition acquisition unit 1011 ends the process thereof, the processing proceeds to the process of step S4009. Further, in step S4009, the processing proceeds to the process of step S4010 if the driving information output unit 1012 determines that the cumulative consumption degree determined in step S4008 is the predetermined threshold value or higher (YES in step S4009), and the processing illustrated in FIG. 6 is ended if the driving information output unit 1012 determines that the cumulative consumption degree is lower than the threshold value (NO in step S4009). After the driving information output unit 1012 ends the process thereof in step S4010, the processing illustrated in FIG. 6 is ended.

When receiving the request for the driving information from the client apparatus 2000, the system control unit 1009 outputs the corrected cumulative number of times of driving updated in the processing illustrated in FIG. 6 by transmitting it to the client apparatus 2000 as the driving information. The client apparatus 2000 outputs the transmitted driving information by displaying it on the output device 2104. Further or alternatively, the client apparatus 2000 may operate so as to output the transmitted driving information as audio via the speaker included in the output device 2104.

The system control unit 1009 may output the driving information by storing it into a set storage destination such as the auxiliary storage device 1102.

The system control unit 1009 may be configured to output the driving information when the driving mechanism having started the driving in step S4002 stops the driving. Alternatively, the system control unit 1009 may be configured to output the driving information periodically at a predetermined time interval (for example, every hour).

In the above-described manner, in the present exemplary embodiment, the information processing system determines the consumption degree of the driving mechanism from the driving condition when the driving mechanism of the imaging apparatus 1000 carries out the driving, and determines the corrected cumulative number of times of driving from the determined consumption degree as the driving information indicating how much the driving mechanism is used. This configuration allows the information processing system to determine the index more accurately indicating how much the driving unit of the imaging apparatus is used.

Further, the information processing system can present the driving information to the user by outputting the driving information on the output device 2104 or the like. This configuration allows the user to be aware of the driving information determined in consideration of the driving condition, thus allowing the information processing system to improve convenience for the user.

Further, each of the driving mechanisms of the imaging apparatus 1000 may be configured to be detachable or replaceable. In this case, the driving information output unit 1012 resets the cumulative consumption degree regarding the replaced or detached driving mechanism that is stored in the auxiliary storage device 1102 or the like. Then, the driving information output unit 1012 newly starts the calculation of the consumption degree by the processing according to the flowchart illustrated in FIG. 6 and the like.

In the following description, a second exemplary embodiment will be described. In the present exemplary embodiment, processing in which the information processing system changes a driving method according to the driving load on the driving mechanism of the imaging apparatus 1000 will be described. The driving load refers to the load regarding the driving of the driving mechanism, and is, for example, the consumption degree regarding the driving.

A system configuration of the information processing system according to the present exemplary embodiment is similar to the first exemplary embodiment. Further, a hardware configuration and a functional configuration of the imaging apparatus 1000 are also similar to the first exemplary embodiment. Further, a hardware configuration and a functional configuration of the client apparatus 2000 are also similar to the first exemplary embodiment.

Figure 9:
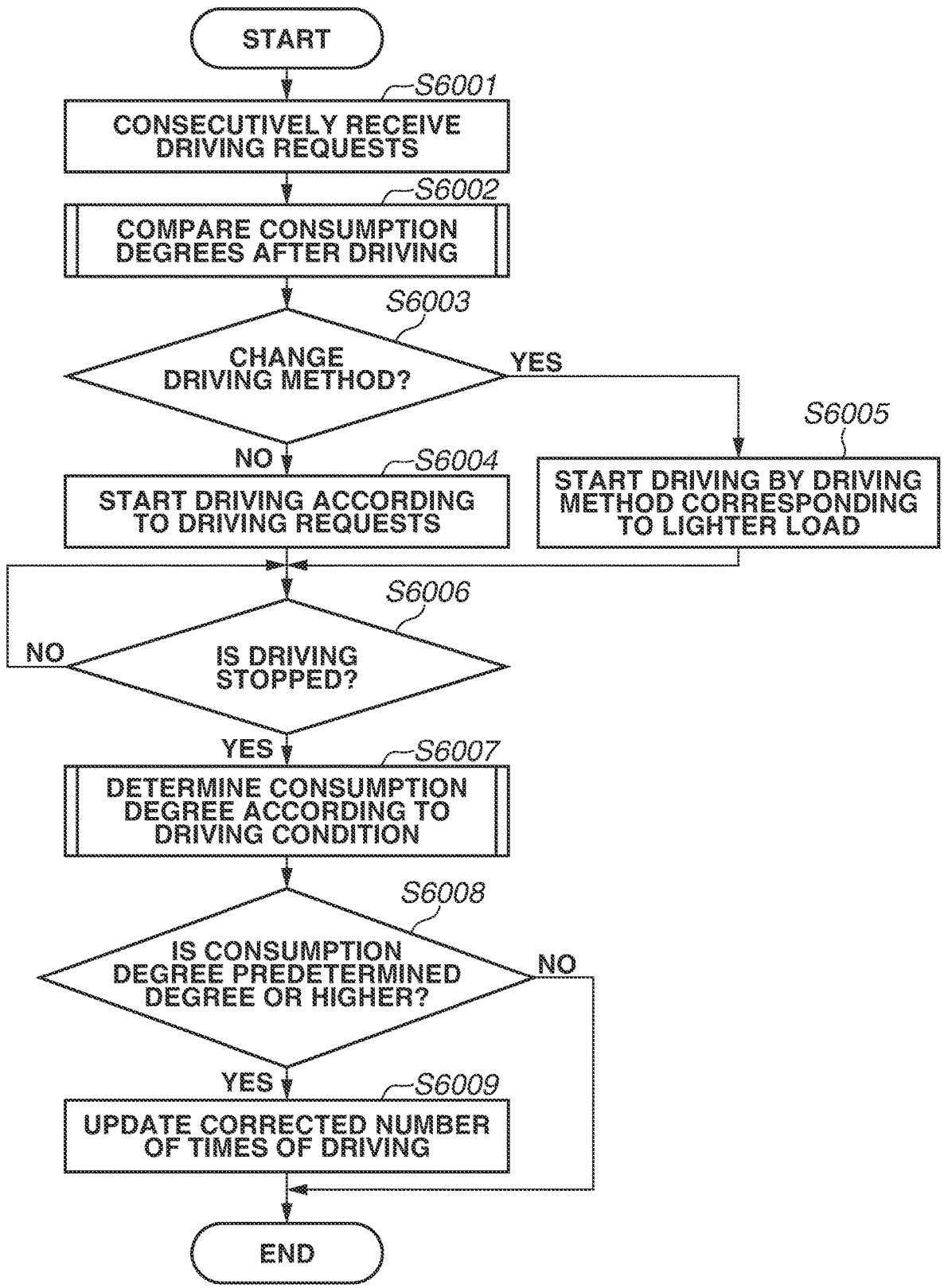
FIG. 9 is a flowchart illustrating one example of processing for changing a driving method.

In the following description, processing according to the present exemplary embodiment will be described with reference to FIGS. 9 and 10. FIG. 9 is a flowchart illustrating one example of processing for changing the driving method. FIG. 10 is a flowchart illustrating one example of processing for comparing driving loads.

FIG. 9 illustrates processing in which the imaging apparatus 1000 consecutively receives a plurality of driving requests directed to the driving mechanism from the client apparatus 2000, and causes the driving mechanism to carry out the driving according to a result of processing performed by the driving information output unit 1012, and this processing will be described now with reference to FIG. 9.

In step S6001, the communication unit 1010 receives the plurality of consecutive driving request commands directed to the driving mechanism from the client apparatus 2000 via the network 3000, and transmits the received driving command requests to the system control unit 1009. Assume that the system control unit 1009 completes the reception of all of this plurality of consecutive driving request commands before or immediately after a start of driving of the driving mechanism. In step S6002, the driving information output unit 1012 compares driving loads on the driving mechanism corresponding to the driving requests received in step S6001 in the following two cases. In a first case, driving operations respectively following the plurality of driving request commands received from the client apparatus 2000 in step S6001 are sequentially carried out, by which the driving and the stop are repeated in a correct order. In a second case, the plurality of driving request commands received in step S6001 is not executed in such a manner that the driving of the driving mechanism is carried out and stopped for each command, but is executed in such a manner that driving defined by connecting the driving operations according to the individual commands is carried out.

The processing illustrated in FIG. 10 indicates a detail of the processing for comparing the driving loads on the driving mechanism in step S6002.

In step S7001, the driving information output unit 1012 estimates a cumulative consumption degree of the driving mechanism in the first case. The driving information output unit 1012 uses a similar method to the method described in step S5010 according to the first exemplary embodiment as the calculation of the cumulative consumption degree. More specifically, the driving information output unit 1012 estimates the cumulative consumption degree of the driving mechanism with use of the equations 1 and 2.

For example, suppose that the plurality of driving requests received in step S6001 is driving requests directed to the pan driving mechanism 1014. Further, suppose that two consecutive driving requests are received in step S6001, and both of contents of the received driving requests are requests to carry out the driving by 15 degrees relative to the current position from the stationary state in the counterclockwise direction at the driving speed of 10 degree/sec. Further, suppose that the cumulative consumption degree until this time point regarding the pan driving mechanism 1014 is 0 degrees. Further, suppose that the temperature of the pan driving mechanism 1014 is the same value as the current temperature. Suppose that the current temperature of the pan driving mechanism 1014 is 80 degrees. Further, suppose that the value of the braking correction term is 5 degrees.

The driving information output unit 1012 calculates a consumption degree of the first driving that will be spent for the first request command, for example, with use of the equation 1. The calculation yields a result of the consumption degree=15×1.10×1.00×1.15+5≈23.98. Further, a consumption degree of the second driving that will be spent for the second request command is the same as the consumption degree of the first driving, and therefore the driving information output unit 1012 calculates the cumulative consumption degree with use of the equation 2. The calculation yields a result of the cumulative consumption degree=0+23.98+23.98≈47.96, and the cumulative consumption degree is calculated to be 47.96 degrees.

In step S7002, the driving information output unit 1012 estimates a cumulative consumption degree of the driving mechanism in the second case. For example, suppose that the plurality of driving requests received in step S6001 is driving requests directed to the pan driving mechanism 1014. Further, suppose that two consecutive driving requests are received in step S6001, and both of contents of the received driving requests are requests to carry out the driving by 15 degrees relative to the current position from the stationary state in the counterclockwise direction at the driving speed of 10 degree/sec. Further, suppose that the cumulative consumption degree until this time regarding the pan driving mechanism 1014 is 0 degrees. In this case, the driving defined by connecting the driving operations according to these two request commands is driving by 30 degrees relative to the current position in the counterclockwise direction at the driving speed of 10 degree/sec.

Therefore, the driving information output unit 1012 performs the following processing with use of the equation 1, determining that the driving amount is 30 degrees, the cumulative consumption degree until this time regarding the pan driving mechanism 1014 is 0 degrees, the temperature of the pan driving mechanism 1014 is 80 degrees, and the value of the braking correction term is 5 degrees. That is, the driving information output unit 1012 estimates the cumulative consumption degree by calculating the cumulative consumption degree of the pan driving mechanism 1014 in the second case with respect to the driving according to the request commands received in step S6001. The calculation yields a result of the cumulative consumption degree=0+(30×1.10×1.00×1.15+5)≈42.96.

In step S7003, the driving information output unit 1012 compares the cumulative consumption degrees estimated in steps S7001 and S7002. If the driving information output unit 1012 determines that the consumption degree estimated in step S7002 is lower than the consumption degree estimated in step S7001 (YES in step S7003), the processing proceeds to a process of step S7004. On the other hand, if the driving information output unit 1012 determines that the consumption degree estimated in step S7002 is the consumption degree estimated in step S7001 or higher (NO in step S7003), the processing illustrated in FIG. 10 is ended, and the processing illustrated in FIG. 9 proceeds to a process of step S6003. Now, the consumption degrees described in the descriptions of steps S7001 and S7002 by way of example are 47.96 degrees in step S7001 and 42.96 degrees in step S7002. This causes the driving information output unit 1012 to determine that the consumption degree estimated in step S7002 is lower than the consumption degree estimated in step S7001 (YES in step S7003), and the processing to proceed to the process of step S7004.

In step S7004, the driving information output unit 1012 sets a driving method change flag stored in the auxiliary storage device 1102 or the like to ON. The driving method change flag is information indicating whether to change the method by which the driving mechanism carries out the driving, and information expressed as any value of ON and OFF. If the driving method change flag is OFF, the imaging apparatus 1000 causes the driving mechanism to carry out and stop the driving according to the commands one by one with respect to the received driving request commands when receiving the plurality of driving request commands directed to the same driving mechanism. If the driving method change flag is ON, the imaging apparatus 1000 causes the driving mechanism to carry out the driving defined by connecting the driving operations according to the received driving request commands when receiving the plurality of driving request commands directed to the same driving mechanism.

After the driving information output unit 1012 ends the processing illustrated in FIG. 10, the processing illustrated in FIG. 9 proceeds to the process of step S6003.

In step S6003, the system control unit 1009 acquires the driving method change flag stored in the auxiliary storage device 1102 or the like. Then, the system control unit 1009 determines whether the acquired driving method change flag is ON or OFF. If determining that the acquired driving method change flag is ON, the system control unit 1009 determines to change the driving method (YES in step S6003), and the processing proceeds to a process of step S6005. On the other hand, if determining that the acquired driving method change flag is OFF, the system control unit 1009 determines not to change the driving method (NO in step S6003), and the processing proceeds to a process of step S6004.

In step S6004, the system control unit 1009 sequentially instructs the pan/tilt/rotation control unit 1006 or the lens control unit 1008 to carry out the driving according to each of the plurality of driving request commands received in step S6001.

In step S6005, the system control unit 1009 instructs the pan/tilt/rotation control unit 1006 or the lens control unit 1008 to carry out the single continuous driving operation defined by connecting the driving operations according to the received plurality of driving request commands. For example, suppose that the driving request command received from the client apparatus 2000 in step S6001 is a request to cause the pan driving mechanism 1014 to carry out the driving by 15 degrees relative to the current position in the counterclockwise direction. Further, suppose that the driving request having the same content is received for the second time consecutively in step S6001. In this case, the driving amount of the pan driving mechanism 1014 when the driving requests are fulfilled one by one is calculated to be 15 degrees+15 degrees=30 degrees. This means that the system control unit 1009 instructs the pan/tilt/rotation control unit 1006 to cause the pan driving mechanism 1014 to carry out the driving by 30 degrees in the counterclockwise direction.

Processes of steps S6006 to S6009 are similar processes to steps S4007 to S4010.

In the above-described manner, in the present exemplary embodiment, the imaging apparatus 1000 is configured to perform the following processing when receiving the plurality of consecutive driving request commands directed to the driving mechanism. That is, the imaging apparatus 1000 estimates the driving load on this driving mechanism when the driving mechanism carries out the driving operations according to the individual commands sequentially, and the driving load on this driving mechanism when the driving mechanism carries out the single driving operation defined by connecting the driving operations according to the individual commands. Then, the imaging apparatus 1000 compares the estimated two driving loads, and controls the driving of the driving mechanism so as to carry out the single driving operation defined by connecting the driving operations according to the individual commands if the driving load on this driving mechanism is lighter when the driving mechanism carries out the single driving operation defined by connecting the driving operations according to the individual commands.

This configuration allows the imaging apparatus 1000 to carry out the driving in consideration of the driving condition, thereby extending the lifetime of each of the driving mechanisms of the imaging apparatus 1000.

Other Exemplary Embodiments

The present invention can also be realized by processing that supplies a program capable of realizing one or more function(s) of the above-described exemplary embodiments to a system or an apparatus via a network or a storage medium, and causes one or more processor(s) in a computer of this system or apparatus to read out and execute the program. Further, the present invention can also be realized by a circuit (for example, an application specific integrated circuits (ASIC)) capable of realizing one or more function(s).

Having described representative exemplary embodiments of the present invention in detail, the present invention shall not be limited to these specific exemplary embodiments. For example, a part or a whole of the functional configuration of the above-described information system may be implemented on the imaging apparatus 1000 or the client apparatus 2000 as hardware.

Further, the above-described individual exemplary embodiments may be arbitrarily combined.

Further, in the first and second exemplary embodiments, the imaging apparatus 1000 is assumed to include the pan driving mechanism 1014, the tilt driving mechanism 1015, the rotation driving mechanism 1016, and the lens driving mechanism 1017. However, the imaging apparatus 1000 may be configured to include a part of these driving mechanisms. Further, the configuration, the processing, and the like of each of the above-described exemplary embodiments may be applied to a PC, a computer, service equipment, or the like other than the imaging apparatus 1000 and the client apparatus 2000.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-103487, filed May 25, 2017, which is hereby incorporated by reference herein in its entirety.

What is claimed is:

1. An imaging apparatus comprising:
    an acquisition unit configured to acquire a driving condition, which is a condition regarding driving of a driving unit of the imaging apparatus;
    a correction unit configured to correct a number of operations of the driving unit depending on the driving condition; and
    an output unit configured to output, to an external apparatus, information indicating the number of operations corrected by the correction unit, in response to a request from the external apparatus,
    wherein the acquisition unit acquires, as the driving condition, at least any one of a driving amount of the driving unit, a driving speed of the driving unit, a temperature of the driving unit, a load according to a type of the driving of the driving unit, a condition regarding the driving of the driving unit that is an orientation driving unit of the imaging apparatus, and a condition regarding the driving of the driving unit that is a lens driving unit of the imaging apparatus, and
    wherein the correction unit corrects, depending on the driving condition, the number of operations to a number which is more than an actual number of operations.

2. An imaging apparatus comprising:
    an acquisition unit configured to acquire a driving condition, which is a condition regarding driving of a driving unit of the imaging apparatus;
    a correction unit configured to correct a number of operations of the driving unit depending on the driving condition; and
    an output unit configured to output, to an external apparatus, information indicating the number of operations corrected by the correction unit, in response to a request from the external apparatus,
    wherein the correction unit corrects, depending on the driving condition, the number of operations to a number which is more than an actual number of operations and corrects the number of operations every time the driving unit carries out the driving.

3. The imaging apparatus according to claim 1, further comprising a control unit configured to, when a plurality of consecutive driving requests directed to the driving unit is received, perform control so as to cause the driving unit to carry out the driving by a driving method according to a result of a comparison between a driving load on the driving unit in a case where driving operations according to the plurality of driving requests are carried out sequentially, and a driving load on the driving unit in a case where one driving operation defined by connecting driving operations according to the plurality of driving requests is carried out.

4. The imaging apparatus according to claim 1, wherein the output unit further transmits information indicating an upper limit on the number of operations of the driving unit to an external apparatus according to a request from the external apparatus.

5. A processing method configured to be performed by an imaging apparatus, the processing method comprising:
    acquiring a driving condition, which is a condition regarding driving of a driving unit of the imaging apparatus;
    correcting a number of operations of the driving unit depending on the acquired driving condition; and
    outputting, to an external apparatus, information indicating the corrected number of operations, in response to a request from the external apparatus,
    wherein, in the acquiring, at least any one of a driving amount of the driving unit, a driving speed of the driving unit, a temperature of the driving unit, a load according to a type of the driving of the driving unit, a condition regarding the driving of the driving unit that is an orientation driving unit of the imaging apparatus, and a condition regarding the driving of the driving unit that is a lens driving unit of the imaging apparatus is acquired as the driving condition, and
    wherein, depending on the acquired driving condition, the corrected number of operations is more than an actual number of operations.

6. A non-transitory storage medium storing a program for causing a computer to perform a processing method configured to be performed by an imaging apparatus, the processing method comprising:
    acquiring a driving condition, which is a condition regarding driving of a driving unit of the imaging apparatus;
    correcting a number of operations of the driving unit depending on the acquired driving condition; and
    outputting, to an external apparatus, information indicating the corrected number of operations, in response to a request from the external apparatus,
    wherein, in the acquiring, at least any one of a driving amount of the driving unit, a driving speed of the driving unit, a temperature of the driving unit, a load according to a type of the driving of the driving unit, a condition regarding the driving of the driving unit that is an orientation driving unit of the imaging apparatus, and a condition regarding the driving of the driving unit that is a lens driving unit of the imaging apparatus is acquired as the driving condition, and
    wherein, depending on the acquired driving condition, the corrected number of operations is more than an actual number of operations.

7. An imaging apparatus comprising:
    an acquisition unit configured to acquire a driving condition, which is a condition regarding driving of a driving unit of the imaging apparatus;
    a correction unit configured to correct a number of operations of the driving unit depending on the driving condition; and
    an output unit configured to output, to an external apparatus, information indicating the number of operations corrected by the correction unit, in response to a request from the external apparatus,
    wherein the correction unit corrects, depending on the driving condition, the number of operations to a number which is more than an actual number of operations, and
    wherein the actual number of operations refers to the number of operations that is accumulated by counting an operation from when the driving unit starts the driving until the driving unit stops the driving as one driving operation.

8. The imaging apparatus according to claim 2, further comprising a control unit configured to, when a plurality of consecutive driving requests directed to the driving unit is received, perform control so as to cause the driving unit to carry out the driving by a driving method according to a result of a comparison between a driving load on the driving unit in a case where driving operations according to the plurality of driving requests are carried out sequentially, and a driving load on the driving unit in a case where one driving operation defined by connecting driving operations according to the plurality of driving requests is carried out.

9. The imaging apparatus according to claim 2, wherein the output unit further transmits information indicating an upper limit on the number of operations of the driving unit to an external apparatus according to a request from the external apparatus.

10. The imaging apparatus according to claim 7, further comprising a control unit configured to, when a plurality of consecutive driving requests directed to the driving unit is received, perform control so as to cause the driving unit to carry out the driving by a driving method according to a result of a comparison between a driving load on the driving unit in a case where driving operations according to the plurality of driving requests are carried out sequentially, and a driving load on the driving unit in a case where one driving operation defined by connecting driving operations according to the plurality of driving requests is carried out.

11. The imaging apparatus according to claim 7, wherein the output unit further transmits information indicating an upper limit on the number of operations of the driving unit to an external apparatus according to a request from the external apparatus.

12. A processing method configured to be performed by an imaging apparatus, the processing method comprising:
acquiring a driving condition, which is a condition regarding driving of a driving unit of the imaging apparatus;
correcting a number of operations of the driving unit depending on the acquired driving condition; and
outputting, to an external apparatus, information indicating the corrected number of operations, in response to a request from the external apparatus,
wherein the correcting, depending on the driving condition, corrects the number of operations to a number which is more than an actual number of operations and corrects the number of operations every time the driving unit carries out the driving.

13. A non-transitory storage medium storing a program for causing a computer to perform a processing method configured to be performed by an imaging apparatus, the processing method comprising:
acquiring a driving condition, which is a condition regarding driving of a driving unit of the imaging apparatus;
correcting a number of operations of the driving unit depending on the acquired driving condition; and
outputting, to an external apparatus, information indicating the corrected number of operations, in response to a request from the external apparatus,
wherein the correcting, depending on the driving condition, corrects the number of operations to a number which is more than an actual number of operations and corrects the number of operations every time the driving unit carries out the driving.

14. A processing method configured to be performed by an imaging apparatus, the processing method comprising:
acquiring a driving condition, which is a condition regarding driving of a driving unit of the imaging apparatus;
correcting a number of operations of the driving unit depending on the acquired driving condition; and
outputting, to an external apparatus, information indicating the corrected number of operations, in response to a request from the external apparatus,
wherein the correcting corrects, depending on the driving condition, the number of operations to a number which is more than an actual number of operations, and
wherein the actual number of operations refers to the number of operations that is accumulated by counting an operation from when the driving unit starts the driving until the driving unit stops the driving as one driving operation.

15. A non-transitory storage medium storing a program for causing a computer to perform a processing method configured to be performed by an imaging apparatus, the processing method comprising:
acquiring a driving condition, which is a condition regarding driving of a driving unit of the imaging apparatus;
correcting a number of operations of the driving unit depending on the acquired driving condition; and
outputting, to an external apparatus, information indicating the corrected number of operations, in response to a request from the external apparatus,
wherein the correcting corrects, depending on the driving condition, the number of operations to a number which is more than an actual number of operations, and
wherein the actual number of operations refers to the number of operations that is accumulated by counting an operation from when the driving unit starts the driving until the driving unit stops the driving as one driving operation.

* * * * *